US010131768B2

(12) United States Patent
Gerard et al.

(10) Patent No.: US 10,131,768 B2
(45) Date of Patent: Nov. 20, 2018

(54) LIQUID (METH)ACRYLIC SYRUP FOR IMPREGNATING A FIBROUS SUBSTRATE, METHOD OF IMPREGNATING A FIBROUS SUBSTRATE, COMPOSITE MATERIAL OBTAINED FOLLOWING POLYMERISATION OF THE PRE-IMPREGNATED SUBSTRATE

(71) Applicants: ARKEMA FRANCE, Colombes (FR); POLE DE PLASTURGIE DE L'EST, Saint Avold (FR); UNIVERSITE DE LORRAINE, Nancy (FR)

(72) Inventors: Pierre Gerard, Denguin (FR); Michel Glotin, Saint-Cloud (FR); Jean-Pierre Cauchois, Obersteinbach (FR); Claire Quinten, Creutzwald (FR); Marius Mihaluta, Freyming-Merlebach (FR); Qing Lin, Metz (FR); Michel Ferriol, Saint-Avold (FR); Marianne Cochez, Pontpierre (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/774,186

(22) PCT Filed: Mar. 10, 2014

(86) PCT No.: PCT/FR2014/050538
§ 371 (c)(1),
(2) Date: Sep. 10, 2015

(87) PCT Pub. No.: WO2014/140465
PCT Pub. Date: Sep. 18, 2014

(65) Prior Publication Data
US 2016/0032080 A1 Feb. 4, 2016

(30) Foreign Application Priority Data

Mar. 11, 2013 (FR) .................................... 13 52157

(51) Int. Cl.
| C08K 5/53 | (2006.01) |
| C08K 3/22 | (2006.01) |
| C08K 5/101 | (2006.01) |
| B29C 70/02 | (2006.01) |
| C08J 5/04 | (2006.01) |
| C08J 5/24 | (2006.01) |
| C08K 5/5313 | (2006.01) |
| C08F 220/14 | (2006.01) |
| C08K 3/32 | (2006.01) |
| C08K 5/5333 | (2006.01) |
| B29K 33/04 | (2006.01) |
| B29K 505/02 | (2006.01) |

(Continued)

(52) U.S. Cl.
CPC .......... *C08K 5/5313* (2013.01); *B29C 70/021* (2013.01); *C08J 5/043* (2013.01); *C08J 5/24* (2013.01); *C08K 3/22* (2013.01); *C08K 5/101* (2013.01); *B29K 2033/04* (2013.01); *B29K 2505/02* (2013.01); *B29L 2031/30* (2013.01); *B29L 2031/34* (2013.01); *C08F 220/14* (2013.01); *C08J 2351/00* (2013.01); *C08K 3/32* (2013.01); *C08K 5/5333* (2013.01); *C08K 2003/2227* (2013.01)

(58) Field of Classification Search
CPC ........ C08K 5/5313; C08K 3/22; C08K 5/101; B29C 70/021; C08J 5/043; C08J 5/24
USPC ......................................................... 524/133
See application file for complete search history.

(56) References Cited

U.S. PATENT DOCUMENTS

| 3,287,155 A | * 11/1966 | Munn ..................... C08F 20/62 427/302 |
| 3,900,444 A | 8/1975 | Racky et al. |
| 4,036,811 A | 7/1977 | Noetzel et al. |

(Continued)

FOREIGN PATENT DOCUMENTS

| KR | 100994923 B | 11/2010 |
| WO | WO 2007/007663 A1 | 1/2007 |

(Continued)

OTHER PUBLICATIONS

"Aluminum diethylphosphinate"—LookChem—http://www.lookchem.com/product_Aluminum-Diethylphosphinate-PFR-SN3010-225789-38-8/14951574.html—Downloaded—Dec. 11, 2016.*
Sigma-Aldrich PMMA (http://www.sigmaaldrich.com/catalog/product/aldrich/182230?lang=en&region=US&cm_sp=Insite-_-prodRecCold_xorders-_-prodRecCold2-1)—Downloaded Jul. 4, 2017.*

*Primary Examiner* — Ling Siu Choi
*Assistant Examiner* — Ronald Grinsted
(74) *Attorney, Agent, or Firm* — Thomas F. Roland

(57) ABSTRACT

The present invention relates to a liquid (meth)acrylic syrup for impregnating a fibrous substrate. The present invention relates in particular to a viscous liquid syrup mainly containing methacrylic or acrylic components. The invention also relates to a process for manufacturing such a syrup. The invention also relates to a process for impregnating a fibrous substrate or long fibers with said viscous liquid syrup. The invention also relates to a fibrous substrate preimpregnated with said syrup, which is useful for manufacturing mechanical or structured parts or products.

Figure 1:
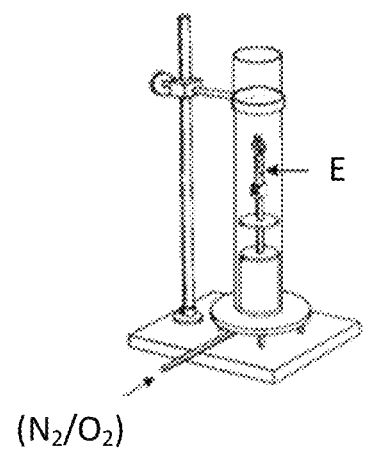

The present invention also relates to a manufacturing process for manufacturing mechanical or structured parts or articles and to three-dimensional mechanical or structured parts obtained by this process.

The invention applies to the preparation of mechanical parts or structural elements made of fire-resistant thermoplastic composite material.

33 Claims, 1 Drawing Sheet

(51) Int. Cl.
  *B29L 31/30*     (2006.01)
  *B29L 31/34*     (2006.01)

(56)     References Cited

U.S. PATENT DOCUMENTS

| | | |
|---|---|---|
| 2007/0299171 A1* | 12/2007 | Couillens ............ C08K 5/34922 524/133 |
| 2010/0112882 A1 | 5/2010 | Conesa et al. |
| 2014/0256850 A1 | 9/2014 | Gerard et al. |
| 2015/0218362 A1 | 8/2015 | Gerard et al. |

FOREIGN PATENT DOCUMENTS

| | | |
|---|---|---|
| WO | WO 2014/135810 A2 | 9/2014 |
| WO | WO 2014/135815 A1 | 9/2014 |
| WO | WO 2014/135816 A1 | 9/2014 |
| WO | WO 2014/140467 A1 | 9/2014 |

* cited by examiner

LIQUID (METH)ACRYLIC SYRUP FOR IMPREGNATING A FIBROUS SUBSTRATE, METHOD OF IMPREGNATING A FIBROUS SUBSTRATE, COMPOSITE MATERIAL OBTAINED FOLLOWING POLYMERISATION OF THE PRE-IMPREGNATED SUBSTRATE

This application claims benefit, under U.S.C. § 119 or § 365 of PCT Application Number PCT/FR2014/050538, filed Mar. 10, 2014; and French Application Number FR 1152157, filed Mar. 11, 2013.

FIELD OF THE INVENTION

The present invention relates to a liquid (meth)acrylic syrup for impregnating a fibrous substrate.

More particularly, the invention relates to a viscous liquid (meth)acrylic syrup mainly containing methacrylic or acrylic components and a flame-retardant for improving the fire resistance of a thermoplastic matrix obtained after polymerization of the syrup. The invention also relates to a process for impregnating a fibrous substrate or long fibers with said viscous liquid syrup. The invention also relates to a fibrous substrate preimpregnated with said syrup which is useful for manufacturing composite parts.

The present invention also relates to a process for manufacturing mechanical parts or structural elements made of composite material and to mechanical parts or structural elements made of composite material obtained via this process.

PRIOR ART

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) and their low density, in comparison with homogeneous materials.

The most important class, in view of volume at the commercial industrial scale, is that of composites with organic matrices, in which the matrix material is generally a polymer. The matrix of a polymeric composite material is either a thermoplastic polymer or a thermosetting polymer.

Thermosetting polymers consist of crosslinked three-dimensional structures. The crosslinking is obtained by curing reactive groups in a prepolymer. Curing may be obtained, for example, by heating the polymer chains in order to crosslink and harden the material permanently. In order to prepare the polymeric composite material, a prepolymer is mixed with the other component, such as glass beads or fibers, or the other component is wetted or impregnated and cured afterwards. Examples of prepolymers or matrix material for thermosetting polymers are unsaturated polyesters, vinyl esters, and epoxy or phenolic materials.

A major drawback of a thermosetting polymeric matrix is its crosslinking. The matrix cannot be easily fashioned into other forms. Once the polymer has crosslinked, the form is set. This also makes difficult the recycling of the thermosetting composite material and of manufactured mechanical or structured parts or articles comprising said thermosetting composite material, which are burned in a cement plant or thrown into a waste dump.

To allow thermoforming and recycling, it is preferred to use thermoplastic polymers.

Thermoplastic polymers consist of linear or branched polymers, which are not crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material. At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material. A syrup that satisfies this problem was developed by the Applicant and is described in the as yet unpublished patent applications FR 1159553, or its PCT extension WO 2013/056845, and FR 1256929 or its PCT extension WO 2014/013028.

Moreover, legislation is increasingly demanding that materials be flame-retardant, especially in the construction or railway sectors. The materials used in public spaces, especially if they are confined, must thus withstand fire resistance tests. Moreover, the environmental constraints also impose that flame-retardant formulations do not contain any halogen, since, during combustion, halogenated flame-retardant agents and acidic and toxic gases risk being released.

The addition of flame-retardant agent(s) should not, however, disrupt the viscosity of the impregnation syrup, so as to impregnate correctly each fiber of the fibrous substrate and to avoid the appearance of defects in the final composite material. The addition of such flame-retardant agent(s) should also not impair the thermoplastic properties of the composite material obtained after polymerization of the preimpregnated fibrous substrate.

Patent application US 2005/0143503 describes a flame-retardant agent in the form of agglomerated particles. The particles consist of 99.99% to 80% of a (di)phosphinate and of 0.01% to 20% of a polymeric binder which may be acrylate-based.

International patent application WO 2005/061606 describes the flame-retardant treatment of a thermoplastic polymer with a mixture of a compound (F1) similar to the phosphinate compound of formula (I) that is used in the present invention, of a compound (F2) which is a product of reaction between phosphoric acid and melamine and/or a product of reaction between phosphoric acid and a melamine condensation derivative and of a compound (F3) which is a melamine condensation derivative.

Patents DE 2447727 and DE 2252258 describe, respectively, polyamides or polyesters that have been rendered flame-retardant with the aid of (di)phosphinates.

Patent application EP 1013713 describes a multilayer structure comprising a layer of a methacrylic composition that has been rendered flame-retardant with the aid of a halogenated compound and a layer of a thermoplastic polymer, such as PVC.

It is not suggested in any of these documents that the incorporation, into a liquid impregnation (meth)acrylic syrup, of flame-retardant substance(s) chosen from phosphorus derivatives or hydrated mineral fillers, with an overall content of not more than 50% by weight, makes it possible to obtain a syrup with an optimum viscosity for correctly impregnating the fibers of a fibrous substrate and makes it possible to obtain, after polymerization of the syrup, a thermoplastic composite material that has been rendered flame-retardant without halogen, which is fire-resistant and whose thermoplastic properties are conserved.

Technical Problem

The aim of the invention is thus to remedy at least one of the drawbacks of the prior art.

The invention is especially directed toward proposing a mechanical part made of thermoplastic composite material which has fire resistance such that the composite material has a limiting oxygen index (LOI) of greater than 32, preferably greater than 40 and advantageously greater than 45.

The invention is also directed toward proposing a mechanical part made of thermoplastic composite material which has fire resistance such that the composite material has values, measured during a cone calorimeter test, of pHRR (peak heat release rate) and THR (total heat released) that are as low as possible, and of TTI (time to ignition) and TOF (time of flame-out) that are as high as possible. The level of fume emission and the amounts of CO and $CO_2$ should also be as low as possible.

The invention is also directed toward completely, correctly and uniformly wetting the fibrous substrate during the impregnation. Any defects of fiber wetting, for example by bubbles and voids, decrease the mechanical performance of the final composite part.

Another object of the present invention is to propose a process that can be performed at low cost and that allows industrial-scale manufacture of mechanical parts or structural elements made of thermoplastic composite material. In addition, the process should be easy and simple to perform using commercially available compounds. The manufacture of the composite parts should also be reproducible and fast, meaning short cycle times.

BRIEF DESCRIPTION OF THE INVENTION

It has been discovered, surprisingly, that a liquid (meth)acrylic syrup for impregnating a fibrous substrate, said fibrous substrate consisting of long fibers, said syrup being characterized in that it comprises:
  a) a (meth)acrylic polymer,
  b) a (meth)acrylic monomer,
  c) at least one flame-retardant substance chosen from:
    phosphorus-based additives such as phosphinates, diphosphinates, phosphonates, phosphates, red phosphorus, ammonium polyphosphates with a number of units n of at least 1000,
    hydrated mineral fillers such as metal hydroxides,
  the overall content of flame-retardant substance in said liquid (meth)acrylic syrup being less than 50% by weight, preferably less than 30%, said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s, gives total and correct impregnation of the fibrous substrate and very good fire resistance after polymerization.

The Applicant has also discovered, surprisingly, that an impregnation process for impregnating a fibrous substrate, said fibrous substrate consisting of long fibers and said process comprising a step of impregnating said fibrous substrate with said liquid (meth)acrylic impregnation syrup, gives full and correct impregnation of the fibrous substrate.

It has also been discovered, surprisingly, that a process for manufacturing composite parts, comprising the following steps:
  a) impregnating a fibrous substrate with such a liquid (meth)acrylic syrup,
  b) polymerizing the liquid (meth)acrylic syrup impregnating said fibrous substrate, makes it possible to obtain thermoplastic composite parts with significantly improved fire-resistance properties, such that the parts made of composite material have a limiting oxygen index (LOI) of greater than 32, preferably greater than 40 and advantageously greater than 45, pHRR and THR values that are as low as possible and TTI and TOF values that are as high as possible.

Moreover, it has also been discovered that a composite part obtained by the manufacturing process, having significantly improved fire resistance, has nearly no defects such as voids between the fibrous substrate and the (meth)acrylic polymer.

DETAILED DESCRIPTION

According to a first aspect, the present invention relates to a liquid (meth)acrylic syrup for impregnating a fibrous substrate, said fibrous substrate consisting of long fibers, and said syrup being characterized in that it comprises:
  a) a (meth)acrylic polymer,
  b) a (meth)acrylic monomer,
  c) at least one flame-retardant substance chosen from:
    phosphorus-based additives such as phosphinates, diphosphinates, phosphonates, phosphates, red phosphorus, ammonium polyphosphates with a number of units n of at least 1000,
    hydrated mineral fillers such as metal hydroxides,
  the overall content of flame-retardant substance in said liquid (meth)acrylic syrup being less than 50% by weight, preferably less than 30%, said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s.

The term "fibrous substrate" as used refers to fabrics, felts or nonwovens that may be in the form of strips, laps, braids, locks or pieces.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule that can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, among which at least one type of phase domain is a continuous phase and in which at least one component is a polymer.

The term "flame-retardant substance" as used refers to a substance, additive or filler, that is capable of retarding the ignition of a material so as to improve its fire resistance.

As regards the composite part, it is a panel, a lid or a shell consisting of a composite material or of parts for aircraft, for boats (hull and bridge), railway vehicles (hatch, bulkhead, enclosure) and motor vehicle parts (bodywork, hood, door).

The liquid (meth)acrylic syrup according to the invention, for impregnating the fibrous substrate, especially comprises a (meth)acrylic monomer or a mixture of (meth)acrylic monomers, a (meth)acrylic polymer and at least one flame-retardant substance for retarding the ignition of the thermoplastic polymer matrix obtained after polymerization of the syrup.

As regards the (meth)acrylic monomer, the monomer is chosen from acrylic acid, methacrylic acid, alkyl acrylic monomers, alkyl methacrylic monomers, hydroxyalkyl acrylic monomers and hydroxyalkyl methacrylic monomers, and mixtures thereof.

Preferably, the monomer is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

More advantageously, the (meth)acrylic monomer is chosen from methyl methacrylate, isobornyl acrylate and acrylic acid, and mixtures thereof.

According to a preferred embodiment, at least 50% by weight and preferably at least 60% by weight of the monomer is methyl methacrylate.

According to a more preferred embodiment, at least 50% by weight, preferably at least 60% by weight, more preferably at least 70% by weight, advantageously at least 80% by weight and even more advantageously 90% by weight of the monomer is a mixture of methyl methacrylate with isobornyl acrylate and/or acrylic acid.

As regards the (meth)acrylic polymer, mention may be made of polyalkyl methacrylates or polyalkyl acrylates.

According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth) acrylate. Preferably, the comonomer is an alkyl acrylate in which the alkyl group contains from 1 to 4 carbon atoms.

According to a preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer should be high, which means greater than 50 000 g/mol and preferably greater than 100 000 g/mol.

The weight-average molecular mass can be measured by size exclusion chromatography (SEC).

The (meth)acrylic polymer is fully soluble in the (meth) acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

As regards the flame-retardant substance, it is chosen from:
  phosphorus-based additives such as phosphinates, diphosphinates, phosphonates, phosphates, red phosphorus, ammonium polyphosphates with a number of units n of at least 1000, hydrated mineral fillers such as metal hydroxides.

The overall content of flame-retardant substance(s) in the (meth)acrylic syrup is less than 50% and preferably less than 30% by weight. Such a content makes it possible to conserve an optimum dynamic viscosity of the (meth)acrylic syrup of between 10 mPa·s and 10 000 mPa·s, preferably between 50 mPa·s and 5000 mPa·s and advantageously between 100 mPa·s and 1000 mPa·s. Such a viscosity allows correct impregnation of all the fibers of the fibrous substrate and makes it possible to obtain, after polymerization of the syrup, a defect-free composite material.

As regards the phosphorus-based additives, the flame-retardant agent is more particularly chosen from the phosphinates or diphosphinates having formula (I) or (II) below:

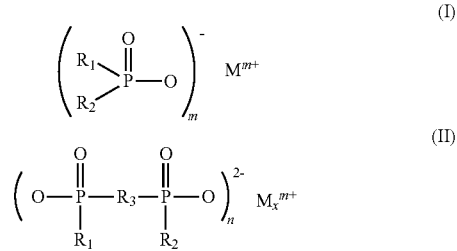

in which:
R$_1$ and R$_2$ denote a linear or branched C$_1$-C$_6$ alkyl and/or aryl group;
R$_3$ denotes a linear or branched C$_1$-C$_{10}$ alkylene, C$_6$-C$_{10}$ arylene, alkylarylene or arylalkylene group;
M denotes Mg, Ca, Al, Sb, Sn, Ge, Ti, Zn, Fe, Zr, Ce, Bi, Sr, Mn, Li, Na or K;
m is an integer between 1 and 4;
n is an integer between 1 and 4;
x is an integer between 1 and 4.

Two or more flame-retardant agents of formula (I) or (II) may also be combined. Advantageously, M denotes Ca, Al or Zn. Preferably, M denotes Al.

R$_1$ and R$_2$ are preferably alkyl groups, for instance methyl, ethyl, n-propyl, isopropyl, n-butyl, tert-butyl, n-pentyl and/or phenyl groups.

R$_3$ is preferably a methylene, ethylene, n-propylene, isopropylene, n-butylene, tert-butylene, n-pentylene, n-octylene or n-dodecylene group. It may also be a phenylene, methylphenylene, ethylphenylene, tert-butylphenylene, methylnaphthylene, phenylmethylene, phenylethylene, phenylpropylene or naphthalene group.

Preferably, a flame-retardant agent of formula (I) in which M denotes Al and R$_1$ and R$_2$ both denote a C$_1$-C$_6$ alkyl group is used. Preferably, R$_1$ and R$_2$ are both ethyl groups or alternatively an ethyl group and a methyl group, i.e. the flame-retardant agent corresponds to a product of formula (III) or (IV):

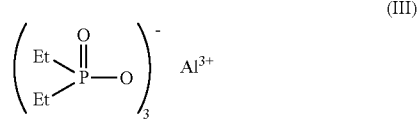

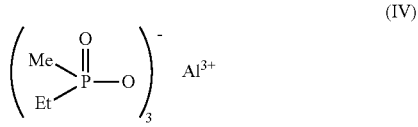

Preferably, to obtain good dispersion in the (meth) acrylic syrup, and homogeneous distribution in the fibers of the fibrous substrate at the time of impregnation, the flame-retardant agent is in the form of particles whose mean diameter D$_{50}$ is between 0.5 and 10 μm and advantageously between 1 and 5 μm. This mean particle diameter D$_{50}$ is measured by laser scattering granulometry, using an instrument of the Microtrac (trademark) range. For the estimation of the mean particle diameter, measurement is made of the mean volume diameter D$_{50}$ or D (v; 0.5), which corresponds to the particle size for which 50% of the sample has a size less than this size and 50% of the sample has a size greater than this size, or, in other words, the equivalent volume diameter at 50% cumulative volume. This size is also known as volume median diameter, which is related to the mass median diameter by the mass per unit volume of the particles, assuming a mass per unit volume independent of the size of the particles.

Preferably, to conserve the optimum viscosity of the syrup, the phosphinate-based flame-retardant additive, when used alone, represents from 5% to 50% by weight, preferably from 10% to 30% by weight and advantageously from 15% to 25% by weight of the (meth)acrylic syrup.

As regards the hydrated mineral fillers, they are essentially metal hydroxides, which are more particularly in the form of aluminum trihydrate (Al(OH)$_3$) or magnesium hydroxide (Mg(OH)). It is preferably aluminum trihydrate (Al(OH)$_3$).

Metal hydroxides undergo endothermic dehydration during their thermal degradation. The release of water cools the composite material and dilutes the gases in the region of the flames, thus causing a delay in ignition. Furthermore, following their thermal degradation, a layer of metal oxide Al$_2$O or MgO which acts as a heat shield forms in the composite material.

Preferably, to obtain good dispersion in the (meth) acrylic syrup, and homogeneous distribution in the fibers of the fibrous substrate at the time of impregnation, the flame-retardant metal hydroxide is in the form of particles whose mean diameter D$_{50}$ is between 0.5 and 10 μm and advantageously between 1 and 5 μm. This mean particle diameter D$_{50}$ is measured by laser scattering granulometry, using an instrument of the Microtrac (trademark) range. For the estimation of the mean particle diameter, measurement is made of the mean volume diameter D$_{50}$ or D (v; 0.5), which corresponds to the particle size for which 50% of the sample has a size less than this size and 50% of the sample has a size greater than this size, or, in other words, the equivalent volume diameter at 50% cumulative volume. This size is also known as volume median diameter, which is related to the mass median diameter by the mass per unit volume of the particles, assuming a mass per unit volume independent of the size of the particles.

Preferably, to conserve the optimum viscosity of the syrup, the metal hydroxide-based flame-retardant fillers, when used alone, i.e. without any other flame-retardant additive, represent from 5% to 50% by weight, preferably from 10% to 50% by weight and advantageously from 10% to 30% by weight or from 30% to 50% by weight and more advantageously from 15% to 25% by weight of the (meth) acrylic syrup.

The flame-retardant additives or the flame-retardant fillers may be used alone or in combination in the (meth)acrylic syrup. The overall content of these substances in the (meth) acrylic syrup should not, however, exceed 50% by weight and is preferably less than 30% by weight, so as to conserve the viscosity of the syrup.

The flame-retardant substance(s) may also be combined with at least one other additive or filler for reinforcing its flame-retardant efficacy. The (meth)acrylic syrup may thus optionally comprise at least one other additive or filler, chosen, for example, from the following list:

additives such as fumed silica or clays/bentonites;

inorganic fillers such as magnesium carbonate, calcium carbonate, magnesium oxide, calcium oxide, hydrotalcite, dihydrotalcite, calcium hydroxide, talc (dihydroxylated magnesium silicate), or metal oxides, for instance zinc oxide, aluminum oxide, titanium oxides or antimony trioxide, or antimony tartrate.

These additives or fillers impede the diffusion of the combustible gases derived from pyrolysis during a fire and consequently make it possible to improve the fire resistance of the final composite material and to reinforce the efficacy of the flame-retardant substance(s) incorporated into the (meth)acrylic syrup.

A filler is not considered to be an additive in the context of the present invention.

In order to conserve a dynamic viscosity of the (meth)acrylic syrup such that it allows good impregnation of the fibrous substrate and to conserve the thermoplastic properties of the matrix obtained after polymerization of the fibrous substrate preimpregnated with syrup, the compounds of the syrup are incorporated in the following mass percentages:

The (meth)acrylic monomer(s) in the liquid (meth)acrylic syrup are present in proportions of between 40% and 80% and preferably between 40% and 70% by weight of the total liquid (meth)acrylic syrup.

The (meth)acrylic polymer(s) in the liquid (meth)acrylic syrup are present in a proportion of at least 1% by weight, preferably at least 5% and advantageously at least 10% by weight of the total liquid (meth)acrylic syrup.

The (meth)acrylic polymer(s) in the liquid (meth)acrylic syrup are present in a proportion of not more than 50% by weight, preferably not more than 35% and advantageously not more than 20% by weight of the total liquid (meth)acrylic syrup.

In particular, the liquid (meth)acrylic syrup comprises:
a) from 5% by weight to 20% by weight of a (meth)acrylic polymer,
b) from 40% by weight to 80% by weight of a (meth)acrylic monomer,
c) from 10% by weight to 30% by weight of a flame-retardant agent of formula (I) or (II), and/or
d) from 15% by weight to 50% by weight of aluminum trihydrate.

All the additives and fillers are added to the liquid (meth)acrylic syrup before the impregnation.

As regards the process for manufacturing the liquid (meth)acrylic syrup, a first step consists in preparing a first syrup comprising the (meth)acrylic monomer or mixture of (meth)acrylic monomers and a (meth)acrylic polymer. The flame-retardant substance(s) are then added to the first syrup, in the proportions indicated above to conserve a dynamic viscosity of between 10 mPa·s and 10 000 mPa·s, preferably between 50 mPa·s and 5000 mPa·s and advantageously between 100 mPa·s and 1000 mPa·s.

As regards the process for impregnating the fibrous substrate, it comprises a step of impregnating the fibrous substrate with the liquid (meth)acrylic syrup. This impregnation step takes place in a closed mold.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear long fibers. The fibers may be discontinuous or continuous. The fibers may be arranged randomly or parallel to each other, in the form of a continuous filament. A fiber is defined by its aspect ratio, which is the ratio between the length and diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers. Animal fibers are, for example, wool or hair.

As synthetic material, mention may be made of polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, and mixtures thereof.

Preferably, the fibrous substrate is chosen from mineral fibers.

The fibers of the fibrous substrate have a diameter between 0.005 μm and 100 μm, preferably between 1 μm and 50 μm, more preferably between 5 μm and 30 μm and advantageously between 10 μm and 25 μm.

Preferably, the fibers of the fibrous substrate of the present invention are chosen from continuous fibers (meaning that the aspect ratio does not necessarily apply as for long fibers) for the one-dimensional form, or for long or continuous fibers for the two-dimensional or three-dimensional form of the fibrous substrate.

According to an additional aspect, the invention relates to a polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate preimpregnated with said liquid (meth)acrylic syrup.

Another aspect of the present invention is a process for manufacturing mechanical or structured parts or products, comprising the following steps:

a) impregnating a fibrous substrate with the liquid (meth) acrylic syrup,
b) polymerizing the liquid (meth)acrylic syrup impregnating said fibrous substrate.

The impregnation of the fibrous substrate in step a) is preferably performed in a closed mold.

Advantageously, step a) and step b) are performed in the same closed mold.

As regards the process for manufacturing composite parts, various processes could be used for preparing parts. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

The preferred manufacturing processes for manufacturing composite parts are processes according to which the liquid (meth)acrylic syrup is transferred to the fibrous substrate by impregnation of the fibrous substrate in a mold, more preferably in a closed mold.

Advantageously, the step of impregnating the fibrous material is performed in a closed mold.

Most advantageously, the process for manufacturing composite parts is chosen from resin transfer molding and infusion.

All the processes comprise the step of impregnating the fibrous substrate with the liquid (meth)acrylic syrup before the step of polymerization in a mold.

The step of polymerization of the liquid (meth)acrylic syrup impregnating said fibrous substrate takes place after the step of impregnation in the same mold.

Resin transfer molding is a process using a two-sided mold set which forms both surfaces of a composite material. The lower side is a rigid mold. The upper side can be a rigid or flexible mold. Flexible molds can be made from composite materials, silicone or extruded polymer films such as nylon. The two sides fit together to form a mold cavity. The distinguishing feature of resin transfer molding is that the fibrous substrate is placed into this cavity and the mold set is closed prior to the introduction of the liquid (meth)acrylic syrup. Resin transfer molding includes numerous varieties which differ in the mechanics of introduction of the liquid (meth)acrylic syrup into the fibrous substrate in the mold cavity. These variations range from vacuum infusion to vacuum assisted resin transfer molding (VARTM). This process may be performed at room or elevated temperature.

With the infusion process, the liquid (meth)acrylic syrup must have the appropriate viscosity for this process for preparing the polymeric composite material. The liquid (meth)acrylic syrup is sucked into the fibrous substrate, which is in a special mold, by applying a gentle vacuum. The fibrous substrate is infused and completely impregnated by the liquid (meth)acrylic syrup.

One advantage of this process is the large amount of fibrous material in the composite.

As regards the use of the mechanical parts made of composite material thus manufactured, mention may be made of automotive applications, transport applications such as buses or lorries, nautical applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building, wind turbine part, furniture part, construction or building part, telephone or cellphone part, computer or television part, or printer or photocopier part.

The mechanical parts or structural elements, obtained after impregnation of a fibrous substrate with the (meth) acrylic syrup and polymerization, underwent fire-resistance tests and have good properties, as is illustrated by the examples below. An additional advantage of the thermoplastic composite material obtained by means of the invention lies in the fact that the (meth)acrylic matrix subjected to a fire gives off a smaller amount of toxic fumes than a phenolic resin used hitherto for making thermosetting composite materials and which especially gives off carbon monoxide. Furthermore, the fumes given off by the combustion of a (meth)acrylic resin are much less opaque than the fumes given off by the combustion of polyester resins or epoxides.

The mechanical parts or structural elements made of composite material obtained after impregnation of a fibrous substrate with the (meth)acrylic syrup and polymerization have a limiting oxygen index LOI of greater than 32, preferably greater than 40 and advantageously greater than 45.

The limiting oxygen index (LOI) is defined as being the minimum percentage of oxygen in an oxygen-nitrogen mixture ($N_2/O_2$) in order for a sustained combustion of a specimen E to be observed (dimensions $40 \times 10 \times 3$ mm$^3$) under the test conditions specified by standard ISO 4589. The LOI thus measures the ease with which a polymer can ignite on contact with a flame. The higher the LOI value, the less the material has a tendency to ignite.

FIG. 1 is a diagram of the apparatus used for performing the LOI measurements.

For an LOI<21, the material is combustible, which is the case for PMMA with an LOI value of 17.3.

For an LOI>21, the material is self-extinguishing (it does not burn in air).

For an LOI=100, the material is totally incombustible.

Figure 2:
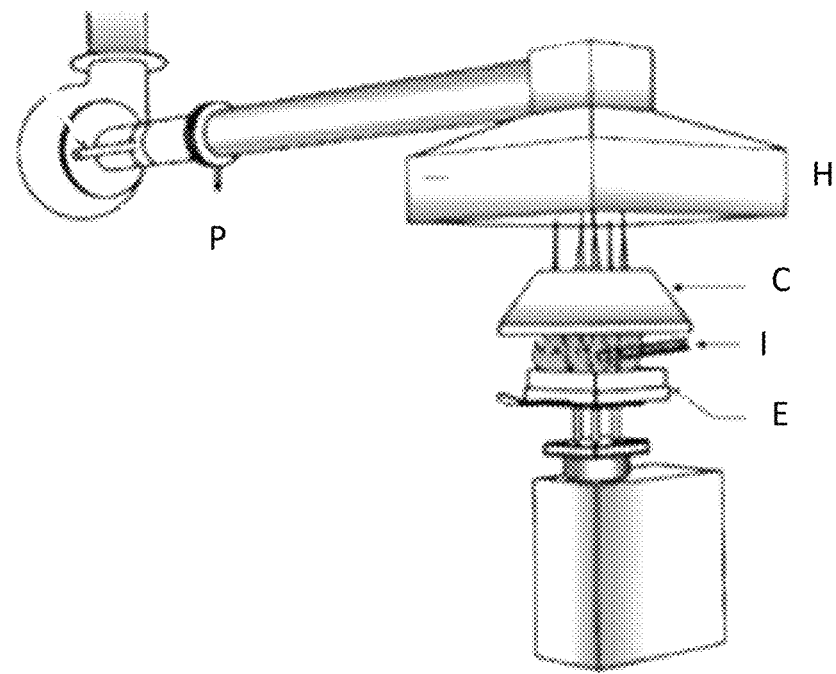

The cone calorimeter test was also used to measure the fire resistance of the composite parts made according to the invention. This cone calorimeter test is the largest on the laboratory scale in the field of fire tests, since it measures important properties under conditions approaching those of a real fire, under the test conditions specified by standard ISO 5660. FIG. 2 is a scheme of the cone calorimeter device used for performing the tests.

Plates E of dimensions $100 \times 100 \times 3$ mm$^3$ are exposed to a flow of heat that may be up to 100 kW·m$^{-2}$ provided by a heating cone C. Combustion is then initiated by a spark I and is maintained by the action of the heating cone C. The change in mass of the sample is monitored throughout the combustion by means of a balance, which makes it possible to determine the rate of loss of mass of the sample MLR (mass loss rate). The gases released are collected by a hood H and then sucked into a pipe in which a device P for sampling and analyzing the gases released makes it possible to measure, inter alia, the gas flow rate and the oxygen concentration. The method is based on the empirical observation that the heat released is directly proportional to the amount of oxygen consumed during the combustion. For the organic material, 1 kg of oxygen consumed corresponds to a release of heat of $13.1 \times 10^3$ kJ. Measurement of the oxygen concentration in the evacuation pipe and the gas flow rate thus make it possible to determine the rate of oxygen consumption and also the heat release rate HRR.

Integration of the curve expressing the change in HRR as a function of time gives the total amount of heat released: THR (total heat released) expressed in $kJ \cdot m^{-2}$. The maximum heat release rate or peak heat release rate (pHRR) is a representative parameter of a fire, since it makes it possible to define its propagation capacity. Other parameters are measured, such as the time to ignition TTI characterizing the ease of ignition of the material, the time of flame-out TOF, the amounts of CO and of $CO_2$ released, the fume release rate, etc.

To define advantageous flame-retarding properties, it is necessary for pHRR and THR to be as small as possible and for TTI and TOF to be as large as possible. The level of fume emission and the amounts of CO and $CO_2$ should also be as low as possible.

EXAMPLES

Example 1 (According to the Invention): Manufacture of a Thermoplastic Composite Based on a (Meth)Acrylic Syrup Comprising Phosphorus-Based Additives First Step: Preparation of the (Meth)Acrylic Syrup A syrup is prepared by dissolving 10% by weight of the PMMA (BS520, a copolymer of MMA comprising ethyl acrylate as comonomer) in 90% by weight of methyl methacrylate, which is stabilized with HQME (hydroquinone monomethyl ether).

A phosphinate OP930 from the company Clariant, with a diameter D50 of 2.5 μm, is incorporated into the (meth)acrylic syrup, such that the proportions of (meth)acrylic polymer, of (meth)acrylic monomer and of phosphinate in the syrup are the following: 8% of (meth)acrylic polymer, 72% of methyl methacrylate and 20% of OP930.

To the 100 parts by weight of the syrup is added 1 part by weight of benzoyl peroxide (BPO—Luperox A75 from the company Arkema).

Second Step: Impregnation of a Fibrous Substrate and Polymerization

The sample was prepared with a taffeta fabric made of 600T glass fiber from the company Chomarat, with a mass per unit area of 600 $g/m^2 \pm 5\%$. The implementation procedure is manual impregnation followed by vacuum compression, more commonly known as wet compression.

This technique consists in manually impregnating each layer of the part. Once all the layers have been impregnated, an absorbent fabric is placed on the peeling fabric so as to absorb the surplus resin leaving the part when it is compacted by the vacuum (500 mbar).

For the draping step, the resin is spread over the mold with a brush and the first reinforcing fold is then inserted. Resin is then redeposited on the fold and the debubbling roller is applied. The operation is then repeated for the eight other folds. The peeling fabric is then positioned and the assembly is covered with a vacuum canvas. The vacuum is drawn to 500 mbar absolute and the whole is then heated at 80° C. for 4 hours before cooling to room temperature to strip from the mold.

The limiting oxygen index (LOI) of the sample is 55.6.

The pHRR value is 187 $kW/m^2$, the THR is 21 $MJ/m^2$, the TTI is 28 seconds, the TOF is 275 seconds and the TOF-TTI is 247 seconds.

Example 2 (Outside the Invention)

First Step: Preparation of the (Meth)Acrylic Syrup

A syrup is prepared by dissolving 25% by weight of the PMMA (BS520, a copolymer of MMA comprising ethyl acrylate as comonomer) in 75% by weight of methyl methacrylate, which is stabilized with HQME (hydroquinone monomethyl ether).

To the 100 parts by weight of the syrup is added 1 part by weight of benzoyl peroxide (BPO—Luperox A75 from the company Arkema).

Second Step: Impregnation of a Fibrous Substrate and Polymerization

The sample was prepared with a taffeta fabric made of 600T glass fiber from the company Chomarat, with a mass per unit area of 600 $g/m^2 \pm 5\%$. The implementation procedure is manual impregnation followed by vacuum compression, more commonly known as wet compression.

This technique consists in manually impregnating each layer of the part. Once all the layers have been impregnated, an absorbent fabric is placed on the peeling fabric so as to absorb the surplus resin leaving the part when it is compacted by the vacuum (500 mbar).

For the draping step, the resin is spread over the mold with a brush and the first reinforcing fold is then inserted. Resin is then redeposited on the fold and the debubbling roller is applied. The operation is then repeated for the eight other folds. The peeling fabric is then positioned and the assembly is covered with a vacuum canvas. The vacuum is drawn to 500 mbar absolute and the whole is then heated at 80° C. for 4 hours before cooling to room temperature to strip from the mold.

The limiting oxygen index (LOI) of the sample is 23.

The pHRR value is 820 $kW/m^2$, the THR is 90 $MJ/m^2$, the TTI is 40 seconds, the TOF is 225 seconds and the TOF-TTI is 180 seconds.

The invention claimed is:

1. A liquid (meth)acrylic syrup for impregnating a fibrous substrate, said fibrous substrate consisting of long fibers having a diameter of from 1 to 50 micron and an aspect ratio of at least 10000, wherein said syrup comprises:
    a) a (meth)acrylic polymer, having a weight-average molecular weight of greater than 50,000 g/mol.
    b) a (meth)acrylic monomer,
    c) at least one flame-retardant substance selected from the group consisting of
       phosphorus-based additives selected from phosphinates, diphosphinates, phosphonates, phosphates, red phosphorus, ammonium polyphosphates with a number of units n of at least 1000, and
       hydrated mineral fillers,
    the overall content of flame-retardant substance in said liquid (meth)acrylic syrup being from 5% to less than 50% by weight, said liquid (meth)acrylic syrup having a dynamic viscosity of between 10 mPa·s and 10 000 mPa·s, wherein the flame-retardant substance(s) are in the form of particles with a mean diameter $D_{50}$ of between 0.5 and 10 μm.

2. The liquid (meth)acrylic syrup as claimed in claim 1, wherein the phosphorus-based additives are chosen from phosphinates or diphosphinates of formula (I) or (II):

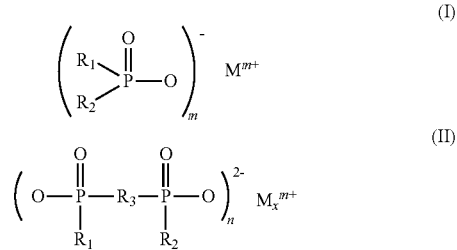

in which:
R₁ and R₂ denote a linear or branched $C_1$-$C_6$ alkyl and/or aryl group;
R₃ denotes a linear or branched $C_1$-$C_{10}$ alkylene, $C_6$-$C_{10}$ arylene, alkylarylene or arylalkylene group;
M denotes Mg, Ca, Al, Sb, Sn, Ge, Ti, Zn, Fe, Zr, Ce, Bi, Sr, Mn, Li, Na or K;
m is an integer between 1 and 4;
n is an integer between 1 and 4;
x is an integer between 1 and 4.

3. The liquid (meth)acrylic syrup as claimed in claim 2, wherein R₁ and R₂ are methyl, ethyl, n-propyl, isopropyl, n-butyl, tert-butyl, n-pentyl and/or phenyl groups.

4. The liquid (meth)acrylic syrup as claimed in claim 2, wherein R₃ is a methylene, ethylene, n-propylene, isopropylene, n-butylene, tert-butylene, n-pentylene, n-octylene or n-dodecylene group; or a phenylene, methylphenylene, ethylphenylene, tert-butylphenylene, methylnaphthylene, phenylmethylene, phenylethylene, phenylpropylene or naphthalene group.

5. The liquid (meth)acrylic syrup as claimed in claim 2, wherein the phosphorus-based additive is of formula (I) and M denotes Al and R₁ and R₂ both denote a $C_1$-$C_6$ alkyl group.

6. The liquid (meth)acrylic syrup as claimed in claim 5, wherein the flame-retardant additive has the formula (III) or (IV):

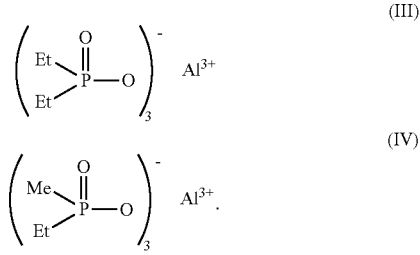

7. The liquid (meth)acrylic syrup as claimed in claim 2, wherein said flame-retardant additive of formula (I) or (II) represents from 10% to 30% by weight of the (meth)acrylic syrup.

8. The liquid (meth)acrylic syrup as claimed in claim 1, wherein the hydrated mineral fillers consist of aluminum trihydrate or magnesium hydroxide.

9. The liquid (meth)acrylic syrup as claimed in claim 8, wherein the hydrated mineral fillers consist of aluminum trihydrate.

10. The liquid (meth)acrylic syrup as claimed in claim 8, wherein the hydrated mineral fillers represent from 10% to 30% by weight of the (meth)acrylic syrup.

11. The liquid (meth)acrylic syrup as claimed in claim 1, wherein said syrup comprises one or more additives selected from the group consisting of fumed silica, clays/bentonites; inorganic fillers, magnesium carbonate, calcium carbonate, magnesium oxide, calcium oxide, hydrotalcite, dihydrotalcite, calcium hydroxide, talc (dihydroxylated magnesium silicate), metal oxides, zinc oxide, aluminum oxide, titanium oxides, antimony trioxide, and antimony tartrate, which reinforce the efficacy of the flame-retardant substance.

12. The liquid (meth)acrylic syrup as claimed in claim 1, wherein the (meth)acrylic polymer is a homo- or copolymer of methyl methacrylate (MMA) or a mixture thereof.

13. The liquid (meth)acrylic syrup as claimed in claim 12, wherein the copolymer of methyl methacrylate (MMA) comprises at least 70%, by weight of methyl methacrylate (MMA).

14. The liquid (meth)acrylic syrup as claimed in claim 12, wherein the copolymer of methyl methacrylate (MMA) comprises from 70% to 99.7% by weight of methyl methacrylate and from 0.3 to 30% by weight of at least one monomer bearing at least one ethylenic unsaturation that can copolymerize with methyl methacrylate.

15. The liquid (meth)acrylic syrup as claimed in claim 12, wherein the (meth)acrylic polymer comprises a comonomer, said comonomer being an alkyl acrylate containing an alkyl group of 1 to 12 carbon atoms.

16. The liquid (meth)acrylic syrup as claimed in claim 15, wherein the comonomer is chosen from methyl acrylate, ethyl acrylate, and a mixture thereof.

17. The liquid (meth)acrylic syrup as claimed in claim 1, wherein the (meth)acrylic monomer is chosen from acrylic acid, methacrylic acid, alkyl acrylic monomers, alkyl methacrylic monomers, and mixtures thereof, wherein said alkyl group in said alkyl acrylate or alkyl methacrylate containing from 1 to 22 linear, branched or cyclic carbons.

18. The liquid (meth)acrylic syrup as claimed in claim 17, wherein the (meth)acrylic monomer selected from the group consisting of methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

19. The liquid (meth)acrylic syrup as claimed claim 17, wherein the (meth)acrylic monomer is chosen from methyl methacrylate, isobornyl acrylate, acrylic acid, and mixtures thereof.

20. The liquid (meth)acrylic syrup as claimed in claim 17, wherein 50% by weight of the (meth)acrylic monomer is methyl methacrylate.

21. The liquid (meth)acrylic syrup as claimed in claim 1, wherein the (meth)acrylic polymer in the liquid (meth)acrylic syrup is present in a content of at least 1% by weight of the total liquid (meth)acrylic syrup.

22. The liquid (meth)acrylic syrup as claimed in claim 1, wherein the (meth)acrylic polymer in the liquid (meth)acrylic syrup is present in a content of not more than 50% by weight of the total liquid (meth)acrylic syrup.

23. The liquid (meth)acrylic syrup as claimed in claim 1, wherein the (meth)acrylic monomer in the liquid (meth) acrylic syrup is present in proportions of between 40% and 80% by weight of the total liquid (meth)acrylic syrup.

24. The liquid (meth)acrylic syrup as claimed in claim 2, wherein the liquid (meth)acrylic syrup comprises:
   a) from 5% by weight to 20% by weight of a (meth)acrylic polymer,
   b) from 40% by weight to 80% by weight of a (meth) acrylic monomer,
   c) from 10% by weight to 30% by weight of a phosphorus-based additives of formula (I) or (II), and/or
   d) from 15% by weight to 50% by weight of aluminum trihydrate.

25. An impregnation process for impregnating a fibrous substrate, said fibrous substrate consisting of long fibers and said process comprising a step of impregnating said fibrous substrate with said (meth)acrylic syrup as claimed in claim 1.

26. The impregnation process as claimed in claim 25, wherein the step of impregnating said fibrous substrate is performed in a closed mold.

27. A polymeric composite material comprising a thermoplastic (meth)acrylic matrix and a fibrous substrate used as reinforcement, in which the fibrous substrate consists of long fibers, wherein said composite material comprises a thermoplastic (meth)acrylic matrix that is obtained after polymerization of said fibrous substrate preimpregnated with said liquid (meth)acrylic syrup as claimed in claim 1.

28. A process for manufacturing mechanical parts or structural elements made of composite material, comprising the following steps:
   a) impregnating a fibrous substrate with a liquid (meth) acrylic syrup as claim 1,
   b) polymerizing the liquid (meth)acrylic syrup impregnating said fibrous substrate.

29. The manufacturing process as claimed in claim 28, wherein the impregnation of the fibrous substrate in step a) is performed in a closed mold.

30. The manufacturing process as claimed in claim 28, wherein step a) and step b) are performed in the same closed mold.

31. The manufacturing process as claimed in claim 28, wherein the process is chosen from resin transfer molding and infusion.

32. A mechanical part or structural element made of composite material as claimed in claim 27.

33. The part as claimed in claim 32, said part being a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

* * * * *